United States Patent [19]

Christ et al.

[11] Patent Number: 4,704,879

[45] Date of Patent: Nov. 10, 1987

[54] TREATMENT MACHINE WITH ROTATABLE TREATMENT DRUM

[75] Inventors: Alfred Christ; Helmuth Lehmann, both of Zurich; Leonhard Spiewok, Wallisellen, all of Switzerland

[73] Assignee: Sulzer-Escher Wyss Ltd, Zurich, Switzerland

[21] Appl. No.: 703,506

[22] Filed: Feb. 20, 1985

[30] Foreign Application Priority Data

Mar. 1, 1984 [CH] Switzerland .......................... 997/84

[51] Int. Cl.[4] .............................................. D06F 21/04

[52] U.S. Cl. .......................................... 68/140; 384/99

[58] Field of Search .................... 68/139, 140; 384/99, 384/114, 117, 247, 258, 107, 448

[56] References Cited

U.S. PATENT DOCUMENTS

| | | | |
|---|---|---|---|
| 1,947,985 | 2/1934 | Harlan | 68/140 |
| 2,621,086 | 12/1952 | King | 384/99 |
| 3,152,461 | 10/1964 | Glover, Jr. | 68/140 X |
| 3,158,416 | 11/1964 | Widmer | 384/99 |
| 3,560,064 | 2/1971 | Silver | 384/114 |
| 3,566,628 | 3/1971 | McAninch et al. | 68/24 |
| 3,617,102 | 11/1971 | Wada et al. | 384/114 X |
| 3,659,441 | 5/1972 | Schuierer | 68/140 X |
| 3,675,977 | 7/1972 | Arsenius et al. | 384/117 |
| 3,782,793 | 1/1974 | Sinner | 384/99 |
| 3,799,628 | 3/1974 | Van Gaasbeek et al. | 384/99 X |
| 3,998,502 | 12/1976 | Walter et al. | 384/107 |
| 4,193,644 | 3/1980 | Miyashta et al. | 384/107 |
| 4,310,204 | 1/1982 | Christ et al. | 384/106 |
| 4,392,751 | 7/1983 | Ida et al. | 384/99 |

FOREIGN PATENT DOCUMENTS

| | | | |
|---|---|---|---|
| 1181990 | 11/1964 | Fed. Rep. of Germany | 384/117 |
| 3001487 | 8/1980 | Fed. Rep. of Germany . | |
| 2334050 | 8/1977 | France | 384/117 |
| 58-615 | 1/1983 | Japan | 384/448 |
| 944584 | 12/1963 | United Kingdom | 384/99 |

*Primary Examiner*—Timothy F. Simone
*Assistant Examiner*—Frankie L. Stinson
*Attorney, Agent, or Firm*—Robert A. Ostmann

[57] ABSTRACT

A treatment machine has a treatment drum mounted in a housing and rotatable by means of an adjustable drive. It is intended particularly for the treatment in batches of a bulk material with differing, changing humidities, treatment temperatures and distributions of the bulk material in, and on the circumference of the treatment drum. The treatment drum is mounted by means of at least two axially spaced bearing rings. Each bearing ring has movable, hydrostatic support elements, distributed evenly around the circumference of the treatment drum, and arranged between a contact surface on the treatment drum and the housing. Each support element has two parts which are able to be displaced in radial direction to each other up to a final position and is supported on the housing via an adjustably elastic intermediate member. Means are included for feeding a fluid under pressure equally to the support elements, and a device is provided to measure the dynamic load on the housing through imbalance of the treatment drum, from which a signal is derived to regulate the drive.

16 Claims, 4 Drawing Figures

3
9
41
9
20
4
1
13
11
2
5
6
42
43
27
8
27
7

9
41
20
9
42
43
2
5
6

10
12
12
11
47
16
16
13
18
14
17
15
19
23
20
25
22
26
24
48
1
21
27
49

2
27
9
34
4
9
9
3
33
44
30
15
46
35
15
29
28
36
15
28
28
45
37
38
39
32
40
31

TREATMENT MACHINE WITH ROTATABLE TREATMENT DRUM

BACKGROUND TO THE INVENTION

The invention relates to a machine for the treatment of bulk material in a drum mounted on axially spaced bearing rings. Machines of this type are used in various processes for the treatment of bulk materials. As used herein the term 'bulk material' designates in general, pourable material which is to be treated, which during treatment may be relatively dry, wet, cold or hot, and distributed with different degrees of uniformity on the circumference of the treatment drum.

Such a treatment machine is exemplified by a washing centrifuge for a pourable chemical product, or by a machine for the cleaning or other treatment of textiles or garments. The washing, wetting or treatment of the material may be carried out alternately with cold or hot means. As charges to be treated, materials of up to several hundred kilograms may be found. A machine of this kind is the subject matter of published British Patent Specification No. GB 2 051 883 A.

Under the various treatment conditions, the drum can be stressed mechanically and/or thermally in a number of ways. An imbalance of varying extent can be found in operation, with irregular distribution of the material in the drum, and a change in the diameter of the treatment drum due to expansion or shrinkage of the drum material caused thermally or mechanically. If the range of treatment conditions for a machine varies over a wide range, especially if a large mass of bulk material is to be treated in the drum from a stand-still to high rotational speeds, the machines of this type to date are liable to breakdown during operation. Such machines can thus be unreliable, and in some cases become unusable.

Effective means of mounting and driving the treatment drum over a wide range of operating conditions in rotary machines have not been satisfactorily devized to date and accordingly machines of this type are usually only able to be used in a restricted range of application.

SUMMARY OF THE INVENTION

The present invention seeks to provide a treatment machine of the type described above which is favourable in cost and reliable in operation, and which in particular is able to be used universally in a broad range of the operating conditions.

According to the invention, a machine for the treatment of bulk material has a treatment drum mounted in an housing and variable drive for rotating the drum, the drum being mounted by means of axially spaced bearings defined by hydrostatic support elements acting between the housing and bearing surfaces on the drum, each support element comprising a support body mounted on the housing by means of a resilient member; a bearing plate forming at least one pressure pocket facing the respective bearing surface, and mounted in the support body to define a sealed chamber therewith; and means for feeding fluid under pressure to said chamber and said at least one pressure pocket, means being provided for adjusting the radial position of the bearing plate. The preferred machines include a fluid circuit for delivering fluid under pressure to the support elements normally simultaneously to the sealed chambers and pressure pockets, and means for controlling the flow of fluid in the circuit to maintain a substantially equal flow of fluid to each support element. Devices according to the invention may also include a device for measuring the dynamic load applied to the housing by the rotating drum, and a control element coupled to the device for controlling the operation of the drum drive in response to signals generated by the device.

The mounting of the drum in machines according to the invention is designed to substantially fully accommodate the stress forces which alter during operation and are caused mechanically, thermally and in terms of expansion, but primarily those caused dynamically in terms of imbalance, without undue redistribution onto the remaining mass of the machine and without damage, and thereby to support the treatment drum reliably up to a dynamic threshold state of the system. The mounting also permits the measurement of the stress forces acting on the treatment drum or on the housing during operation, and the regulation of the drive on the basis of the measurement signal, so that it is possible to prevent these forces from exceeding a dynamic threshold state which is unsafe or unstable.

BRIEF DESCRIPTION OF THE DRAWINGS

Further advantages and preferred features of the invention will be apparent from the following detailed description of embodiments thereof, which are given only by way of example. It will be appreciated that the various features referred to may be adopted with or without the other items described. In the drawings.

DESCRIPTION OF THE PREFERRED EMBODIMENTS

Figure 1:
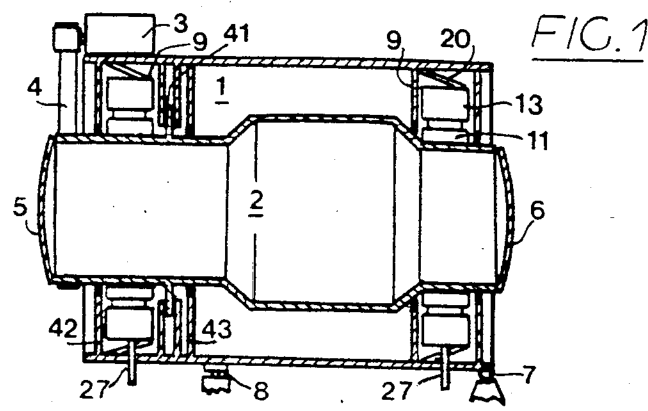
FIG. 1 shows a first embodiment of the invention diagrammatically, and partially in axial longitudinal section.

The treatment machine of FIG. 1 has a treatment drum 2 rotatably mounted in an housing 1. To rotate the treatment drum 2 about its longitudinal axis, a drive is provided which has a motor 3 able to be regulated as to torque and rotational speed and, for example, a toothed belt 4.

The machine is intended for a treatment, in batches, of a bulk material. When the treatment drum is at a standstill, the material which is to be treated is loaded in cold state after an inlet cover 5 is opened. After the cover 5 is closed, the material is wetted with a hot or cold fluid via ducts (not shown) during a slow rotation of the treatment drum, in a subsequent phase with a faster rotation the fluid is centrifuged away out of the material through perforations in the drum wall, which are not shown, and then rinsing takes place with a cold or hot fluid, during rotation. The material, which may be treated several times in this way if required, is carried out after an outlet cover 6 is opened. The loading and unloading of the treatment drum, and also the through transportation of the material are facilitated by tilting the machine about a pivotal point 7 by means of a lifting device 8. During treatment, and because of the varying treatment temperatures, changes in diameter of the drum may occur, possibly up to approximately ±2 mm, and the circumferential speeds of the drum 2 may exceed 50 m/sec.

Figure 2:
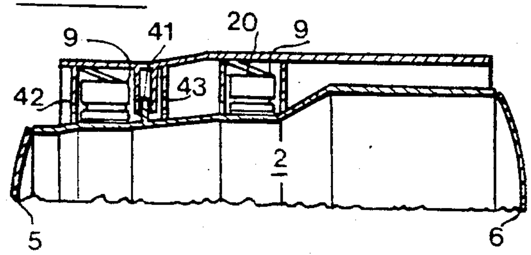
FIG. 2 shows the upper part of a second embodiment, also in longitudinal section.
Figure 3:
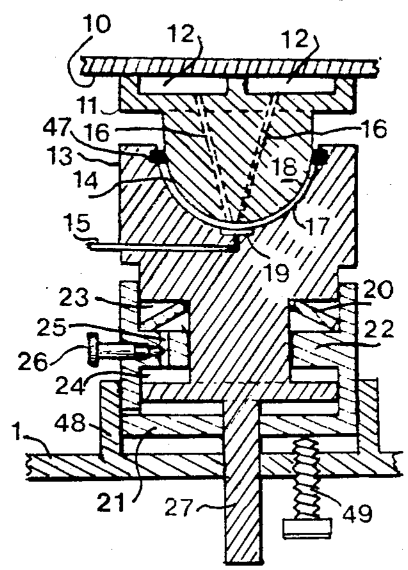
FIG. 3 shows in enlarged cross section, an hydrostatic support suitable for use in the embodiments of FIGS. 1 and 2.

The treatment drum 2 is mounted in the housing 1 by means of at least two, normally at least three, bearing rings, which have movable, hydrostatic support elements 9. These bearing rings are arranged at a distance from each other in axial direction in relation to the treatment drum 2. As shown in FIG. 1, the bearing rings are arranged on the two end regions of the treatment drum 2. In the embodiment of FIG. 2, the drum 2 is mounted in overhung arrangement in the housing, whereby the bearing rings are provided on one side (the left as shown) of the drum.

Each bearing ring in the embodiments described has at least three hydrostatic support elements 9, which are evenly distributed in a circle on the outer wall of the drum and are arranged between a bearing surface 10 in the form of a circular cylinder on the circumference of the drum 2 and finished accordingly, and the housing 1.

The support elements are movable, which means they can adapt themselves to an altering distance from the bearing surface 10 to the housing 1 in radial direction, by having at least two parts 11 and 13 which are able to be displaced with respect to each other in radial direction of the bearing up to a final position and are supported via an adjustably elastic intermediate member 20 on the housing. Each of the hydrostatic support elements 9 in a bearing ring is supplied volumetrically with a substantially equal flow quantity of a pressure fluid to maintain its hydrostatic mode of operation, as is described below with reference to FIG. 4.

A device is provided on the machine to measure the dynamic load on the housing through an imbalance of the treatment drum 2, from which a signal is derived to regulate the drive of the treatment drum 2. The manner in which the measurement and regulation are carried out is described below. With the device shown, the dynamic load of the housing 1 through the imbalance as a result of an irregular distribution of the material in the treatment drum 2 is measured as the drum rotates. For this, an indicator 27 is provided to emit a signal to reduce the rotational speed of the drum, when the dynamic system of the treatment machine reaches (a normally predetermined) permissible load threshold.

The hydrostatic support element 9, bearing the treatment drum 2 radially, has a bearing plate 11 with at least one, normally at least three pressure pockets 12 facing the bearing surface 10. The bearing plate is embedded in a support body 13 which is supported on the housing 1, so as to be displaceable in the direction of the load to be carried up to a final position.

Between the two parts 11 and 13 a pressure chamber 14 is provided which is sealed with an elastic seal 47, and which is to be supplied with a pressure fluid via a duct 15. The pressure fluid fills the sealed pressure chamber 14 on the build up of a pressure, supports and carries the bearing plate 11 in the direction of the force which is to be carried and flows through throttle bores 16 in the support plate into the pressure pockets 12 to build up a hydrostatic pressure between the bearing plate 11 and the bearing surface 10. The pressure fluid forms a fluid film which prevents a dry friction between the parts and flows away through the gap between the bearing plate 11 and the bearing surface 10 into the surrounding area. According to this known principle, the bearing plate 11 continuously moves in the direction of the force to be carried, and under its effect between the bearing surface 10 and the support body 13 corresponding to the respective pressure difference between the pressure pockets 12 and the pressure chamber 14. So as to accommodate tumbling movements of the treatment drum 2 which may possibly occur, the pressure chamber 14 is constructed between a concave surface 17 in the support body 13 and a convex surface 18 constructed so as to be complementary thereto. These are shown as hemispherical surfaces 17 and 18. Since the pressure chamber 14 is constantly under the pressure of the pressure fluid which is supplied —a channel system 19 provides for this —, a minimal surface pressure onto the spherical surfaces is achieved. The support element is designed such that approximately 90% of the force which is to be carried is taken up hydrostatically during operation up to the dynamic load threshold, and only approximately 10% through direct contact of the spherical surfaces. Thereby the contact friction forces are negligibly small, and the bearing plate 11 can align itself practically freely according to the position of the bearing surface 10.

The support body 13 is supported by means of an adjustably elastic resilient intermediate member which is able to be moved in radial direction of the load to be carried, here a plate spring 20 on the housing. Adjustment is possible by means of an adjusting screw 49. A different support is also conceivable, e.g. a rubber elastic block, a fluid cushion or a plate spring set with damping properties.

To damp the elasticity of the spring 20 or the movements of the support body 13 against the spring 20 and the housing 1, in the example shown a damping device is provided parallel to the intermediate member, the spring 20; the support body 13 is embedded in the manner of a piston in a sleeve or base 21 fastened to the housing 1, and is constructed complementary with the sleeve 21 to delimit two chambers 23 and 24 which are filled with a fluid and are separated from each other by means of a dividing wall 22. The plate spring 20 is accommodated in the chamber 23. A connecting channel 25 leads through the dividing wall 22, the profile of which channel is able to be altered by means of a throttle screw 26. On the relative movement of the support body 13 to the sleeve 21, or to the housing 1, the fluid flows from one of the chambers 23 or 24 throttled into the other, which damps the movement. The damping effect of the device may be adjusted by means of the throttle screw 26.

The static force-path characteristic of this described support element arrangement is as follows: constant supporting force up to the point at which the spherical surfaces 17 and 18 come to rest with respect to each other; then increasing supporting force corresponding to the spring characteristic of the spring 20. The dynamic force-path characterised in the case of deflections of the drum 2 under imbalance comprises a damping loop, both in the constant force part and also in the rising part, the extent of which in the constant force part is given through the deflection speed of the drum 2 under imbalance, and in the rising part the supporting force may be adjusted by means of the throttle screw. The two described bearing rings with the hydrostatic support elements produce a resilient and adjustably damped bearing which reliably centres the treatment drum 2.

The measurement of the dynamic load of the housing 1 through the imbalance loading of the treatment drum 2, which is used to regulate the drive of the drum 2, consists of the measurement of the pressure with which the support body 13 of a support element 9 acts on the housing. For this the distance is measured which is present between the support body 13 and the housing 1 on pressure of the support body against the spring 20, which distance therefore indicates the extent of the deflection of the deflecting treatment drum 2 under the effect of the imbalance. For this the indicator 27 is fitted to the side of the support body 13 facing the housing, which indicator leads through an adjacent wall of the housing 1. Its deflection gives the extent of the dynamic load of the system through the imbalance and to regulate the drive it signals whether with the existing rotational speed of the drum 2 a threshold of the dynamic loading capacity of the system has been reached or not. According to the deflection the rotational speed is retained, reduced or increased.

Figure 4:
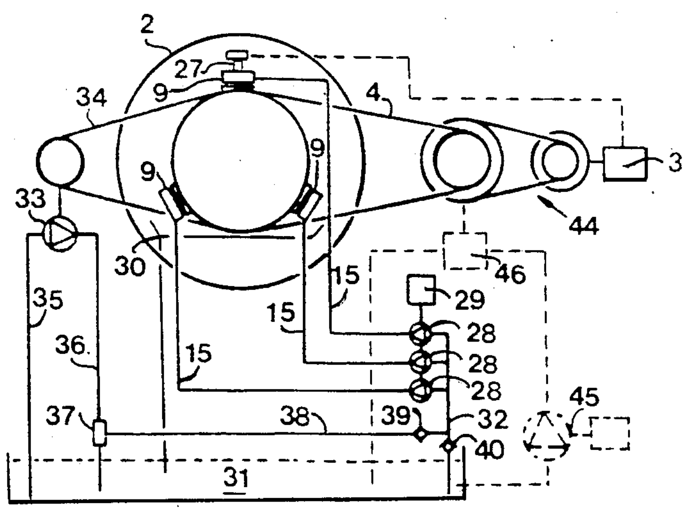
FIG. 4 shows diagrammatically a fluid circuit and drum drive mechanism suitable for the embodiments of FIGS. 1 and 2.

A hydrodynamic bearing 41 is provided for the axial bearing of the treatment drum 2. As fluid for this bearing, fluid is used which flows away from the hydrostatic support elements 9. For this, with circular walls 42 and 43, a bearing housing is formed which is sealed from the surrounding area and embraces the support elements 9, in which bearing housing the hydrodynamic axial bearing 41 is accommodated, and is therefore located in the sump of the issuing fluid. Its supply with fluid is thereby ensured. Connected to this bearing housing is a duct 30, which is shown in FIG. 4, for the removal of the fluid. Between the circular walls 42 and 43 and the outer wall of the treatment drum an expedient, movable, elastic seal is provided.

Oil is provided as fluid to supply the hydrostatic support elements 9 and for the axial bearing 41. For certain fields of application of the treatment machine, however, a different fluid, e.g. water, may also be used. The described treatment machine or its housing 1 may be fastened relatively rigidly to a base. The predominant proportion of the dynamic deflections of the treatment drum, caused by the imbalance, is charged to the described bearing system with the hydrostatic support elements. Only a small remainder thereof needs to be charged to the support of the machine on the base.

As is expediently shown in FIG. 4, support elements 9 are supplied with the pressure fluid volumetrically each with a substantially equal flow quantity of the pressure fluid. The fluid is supplied by controllable, volumetric elements, pumps or quantity dividers 28. These are coupled to a common, controllable motor 29 for drive or are acted upon by a main pump 45. They supply the pressure fluid, dosed via pressure ducts 15 to the individual support elements 9. The fluid flowing away out of the support elements is returned via a removal path 30 into a container 31, from which the fluid for the volumetric elements 28 is sucked out via a duct 32.

To accommodate breakdown of the motor 29 driving the volumetric elements 28 or of the main pump 45, an auxiliary pump 33 is provided which is coupled to the treatment drum drive. It is driven by means of a belt 34 by the treatment drum 2. The pump sucks the fluid out of the fluid container 31 through a duct 35 and delivers the pressure fluid via a duct and a two way solenoid valve 37, in the event of the motor 29 of the volumetric pumps 28 running, relieved of pressure into the container 31. This auxiliary pump 33 is connectable to the suction duct 32 of the pumps 28: In a breakdown in operation of the motor 29, the two-way solenoid valve 37 drops and now directs the pressure fluid into a connecting duct 38 and thus into the suction duct 32 to the volumetric pumps 28, which with the failed, passively rotating motor 29, act as volumetric distributors of the pressure fluid for the hydrostatic support elements 9. Non-return valves 39 and 40 are provided to prevent undesired directions of flow of the fluid on the ducts 38 and 32. A breakdown of the motor 29 causes a signal to switch off the motor 3 for the drive of the treatment drum 2.

The drive of the treatment drum 2, which is able to be regulated in accordance with the measurement of the load of the housing 1 through imbalance, is realized by known commercially conventional means. The drive has a motor 3 and is provided with a torque converter 44 to take up or overcome the torque peaks occurring during the driving of the treatment drum 2 to achieve its rotational speed which is required within the application range. This application range lies between standstill and the highest rotational speed of the treatment drum which is to be used. The torque converter 44 shown in FIG. 4 may, for example, be a belt drive back gearing arrangement with variable transmission. The drive of the treatment drum 2 is regulated, for example, as follows: The rotational speed of the drum charged at a low rotational speed is gradually increased, whereby in this period of time a gradual shifting of the bulk material to a somewhat uniform layer on the circumference of the treatment drum is to be achieved; on further increase of the rotational speed, the dynamic load of the bearing is indicated via the measuring device. If with the instantaneous rotational speed the dynamic load threshold of the system is reached, the rotational speed may not be increased any more. The rotational speed reached is reduced to a rotational speed at which a renewed, repeated shifting of the bulk material may take place or may be achieved in the treatment drum. Thereafter, the rotational speed may be increased once again, until the measuring device, if the occasion arises, indicates an overload. It may therefore happen that the shifting process is repeated several times. If the shifting in the described manner is not successful, the situation in the drum must be monitored visually when at a standstill, in order to be able to establish the cause of the imbalance and to eliminate it.

The regulating of the drive is automated with known means corresponding to or in accordance with a treatment programme. The indication of overload by the path indicator 27 may be integrated in the regulating system. It is conceivable to replace the described mechanical path indicator 27 with some known electrical tensometric means. A measuring device may also be provided on the housing, which scans the vibration acceleration of the housing. A drive with an adjustable direct current motor, with thyristor engineering or with alternating current converter engineering is also advantageous.

Also advantageous is an application of hydrotechnics in the drive of the treatment drum 2, since this is already used in the bearing. The fluid from the container 31 is then also used for the drive and its adjustment. For this instance, as drawn in dashed lines in FIG. 4, an hydraulic circuit is provided which is connected to the container 31, with a hydro-pump 45 which is able to be adjusted as to stroke volume and rotational speed and with a hydro-motor 46 which is able to be adjusted as to stroke volume and rotational speed. The hydro-pump 45 may also act upon the volumetric elements, now quantity dividers 28. In the last two solutions for the drive, the back-gearing arrangement 44 was superfluous.

For the instances in which particularly large masses are to be moved, where a start up with a large energy requirement is involved, where high torque peaks are to be overcome, known reversing automatics are to be considered for the drive, operating periodically, i.e. during start up, which overcome the torque peaks of such a start up such that the mass is moved back and forth several times in time with the inherent oscillating frequency of the mass, until the accumulated momentum is sufficient to overcome the torque peak. As is known, for example, heavy church bells are set swinging in this way.

We claim:

1. A machine for treating bulk material comprising a. a housing containing a treatment drum supported for rotation by at least two axially spaced radial bearing means, b. each radial bearing means including a bearing surface on the drum and a circumferential series of radially arranged hydrostatic support elements acting between the associated bearing surface and the housing and supporting the drum in all radial directions, c. each hydrostatic support element comprising a radially displaceable support body, and adjustable, resilient intermediate member acting between the support body and the housing, and a bearing plate displaceable radially relatively to the support body and defining therewith a pressure chamber, and having a surface facing the associated bearing surface of the drum which contains at least one pressure pocket, d. each radial bearing means also including means for supplying hydraulic fluid under pressure and at equal flow rated to the pressure chambers and pockets of the hydrostatic support elements;

e. variable speed drive means for rotating the drum; and f. control means which measures the dynamic load applied to the housing by the rotating drum and regulates the drive means in response thereto.

2. A machine according to claim 1 wherein the control means includes means for generating a signal which varies with the dynamic load, and regulating means for the drive means which responds to that signal.

3. A machine according to claim 1 wherein each pressure chamber is formed between a concave surface on the support body and a complementary convex surface on the bearing plate and is connected by a throttle bore with said at least one pressure pocket.

4. A machine according to claim 3 wherein said concave and convex surfaces are hemispherical surfaces.

5. A machine according to claim 3 or claim 4 wherein the support body is formed with a duct for the delivery of fluid under pressure to the pressure chamber which opens into a channel system provided on one of the concave and convex surfaces.

6. A machine according to claim 1 wherein the intermediate member comprises a seat adjustable radially with respect to the housing; and a spring reacting between the seat and the support body.

7. A machine according to claim 6 wherein the spring comprises one or more plate springs.

8. A machine according to claim 6 or claim 7 including an hydraulic damping device for damping the movements of the support body relative to the housing.

9. A machine according to claim 1 wherein the control means includes means measuring the pressure with which a support body acts radially on the resilient intermediate member or on the housing.

10. A machine according to claim 9 in which the measuring means is a path indicator on the support body which indicates the position of the support body with respect to the housing.

11. A machine according to claim 1 wherein the control means includes means to scan the vibration acceleration of the housing.

12. A machine according to claim 1 in which the means for supplying hydraulic fluid includes adjustable volumetric elements, pumps or quantity dividers connected to control the flow of pressure fluid to the various support elements and driven by a common motor or supplied by a main pump; an auxiliary supply pump driven by the drum drive means; and valving means for selectively connecting the pressure side of the auxiliary pump to the suction side of the volumetric elements in response to breakdown of the common motor or main pump.

13. A machine according to claim 1 wherein the drum drive means includes an adjustable back gearing arrangement for intensifying torque to take up or overcome torque peaks as they occur in use of the machine.

14. A machine according to claim 1 wherein the drum drive means comprises an hydromotor which is adjutable as to stroke volume and rotational speed, and which is supplied with fluid under pressure by an hydro-pump, also adjustable as to stroke volume and rotational speed.

15. A machine according to claim 1 wherein the drum drive means includes reversing automatics operable periodically to overcome high torque peaks.

16. A machine according to claim 1 in which one radial bearing means includes an outlet chamber for collecting hydraulic fluid which exits from the hydrostatic support elements; and including an hydrodynamic axial bearing in the outlet chamber for axially locating the treatment drum.

* * * * *